US011922317B2

(12) United States Patent
Takehara (10) Patent No.: US 11,922,317 B2
(45) Date of Patent: Mar. 5, 2024

(54) LEARNING DATA GENERATION APPARATUS, LEARNING MODEL GENERATION SYSTEM, LEARNING DATA GENERATION METHOD, AND NON-TRANSITORY STORAGE MEDIUM

(71) Applicant: JVCKENWOOD Corporation, Yokohama (JP)

(72) Inventor: Hideki Takehara, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 757 days.

(21) Appl. No.: 17/001,716

(22) Filed: Aug. 25, 2020

(65) Prior Publication Data
US 2020/0387756 A1 Dec. 10, 2020

Related U.S. Application Data (63) Continuation of application No. PCT/JP2019/009536, filed on Mar. 8, 2019.

(30) Foreign Application Priority Data

Mar. 8, 2018 (JP) ................................ 2018-042291

(51) Int. Cl.
 *G06N 3/084* (2023.01)
 *G06F 18/21* (2023.01)
 (Continued)

(52) U.S. Cl.
 CPC ......... *G06N 3/084* (2013.01); *G06F 18/2155* (2023.01); *G06F 18/2193* (2023.01);
 (Continued)

(58) Field of Classification Search
 CPC . G06F 18/2155; G06F 18/2193; G06N 20/00; G06N 3/045; G06N 3/084;
 (Continued)

(56) References Cited

U.S. PATENT DOCUMENTS

2011/0243426 A1* 10/2011 Hu .................... G06V 10/7747
                                                             382/159
2014/0079297 A1*  3/2014 Tadayon ............. G06V 40/172
                                                             382/118
(Continued)

FOREIGN PATENT DOCUMENTS

JP    2006-343791    12/2006
JP    2017-111731     6/2017

OTHER PUBLICATIONS

Yang Long, "Accurate Object Localization in Remote Sensing Images Based on Convolutional Neural Networks," Jan. 19, 2017, IEEE Transactions on Geoscience and Remote Sensing, vol. 55, No. 5, May 2017, pp. 2486-2495.*
Junwei Han, "Object Detection in Optical Remote Sensing Images Based on Weakly Supervised Learning and High-Level Feature Learning," May 23, 2014, IEEE Transactions on Geoscience and Remote Sensing, vol. 53, No. 6, Jun. 2015, pp. 3325-3332.*

(Continued)

*Primary Examiner* — Omar S Ismail
(74) *Attorney, Agent, or Firm* — Amin, Turocy & Watson, LLP (57) ABSTRACT

A learning data generation apparatus includes an object extraction unit configured to extract an object image from an image; a classification evaluation unit configured to evaluate the object possireimage based on a learned model, and to calculate reliability indicating a degree of posibility that the object image is classified as a candidate label; a classification determination unit configured to, if the reliability is smaller than a first threshold and equal to or larger than a second threshold which is smaller than the first threshold, associate a temporary label different from the candidate label with the object image; and a learning data generation unit configured to generate learning data based on the object image that is associated with the temporary label.

8 Claims, 8 Drawing Sheets

(51) Int. Cl.
*G06F 18/214* (2023.01)
*G06N 5/04* (2023.01)
*G06N 20/00* (2019.01)
*G06V 10/764* (2022.01)
*G06V 20/00* (2022.01)

(52) U.S. Cl.
CPC .............. *G06N 5/04* (2013.01); *G06N 20/00* (2019.01); *G06V 10/764* (2022.01); *G06V 20/00* (2022.01)

(58) Field of Classification Search
CPC ........ G06N 5/04; G06T 7/136; G06V 10/764; G06V 20/00
See application file for complete search history.

(56) References Cited

U.S. PATENT DOCUMENTS

| | | |
|---|---|---|
| 2017/0083791 A1* | 3/2017 | Shiratani ................ A61B 1/041 |
| 2018/0121765 A1* | 5/2018 | Takimoto ............ G06F 18/2193 |
| 2019/0311301 A1* | 10/2019 | Pyati ..................... G06F 16/901 |
| 2020/0012899 A1* | 1/2020 | Nakayama .............. G06F 18/24 |

OTHER PUBLICATIONS

Fabian Gieseke, "Convolutional neural networks for transient candidate vetting in large-scale surveys," Aug. 23, 2017, MNRAS 472, pp. 3102-3110.*

International Search Report and Written Opinion for International Application No. PCT/JP2019/009536 dated May 14, 2019, 9 pages.

* cited by examiner

| CANDIDATE LABEL | RELIABILITY |
|---|---|
| F01 | 0.05 |
| F02 | 0.07 |
| F03 | 0.86 |
| F04 | 0.02 |
| F05 | 0.00 |

RELIABILITY TABLE

FIG.4

MAXIMUM RELIABILITY

FIG.5

| LABEL | OBJECT IMAGE |
|---|---|
| F01 | P1, P2, P10, P12, P13, P16 |
| F02 | P3, P19 |
| F03 | P18 |
| F04 | P4, P9, P17, P20 |
| F05 | ABSENT |

LABEL TABLE

FIG.6

| TEMPORARY LABEL | OBJECT IMAGE |
|---|---|
| F06 | P5, P8, P11, P14, P15 |
| F07 | P6 |

TEMPORARY LABEL TABLE

FIG.7

| LABEL | OBJECT IMAGE |
|---|---|
| F01 | P1, P2, P10, P12, P13, P16 |
| F02 | P3, P19 |
| F03 | P18 |
| F04 | P4, P9, P17, P20 |
| F05 | ABSENT |
| F06 | P5, P8, P11, P14, P15 |

LABEL TABLE

FIG.8

| LABEL | LEARNED IMAGE |
|---|---|
| F01 | P101 TO P200 |
| F02 | P201 TO P300 |
| F03 | P301 TO P400 |
| F04 | P401 TO P500 |
| F05 | P501 TO P600 |

LEARNED DATA TABLE

FIG.9

| LABEL | LEARNED IMAGE |
|---|---|
| F01 | P101 TO P200 |
| F02 | P201 TO P300 |
| F03 | P301 TO P400 |
| F04 | P401 TO P500 |
| F05 | P501 TO P600 |
| F06 | P5, P8, P11, P14, P15 |

LEARNED DATA TABLE

| LABEL | LEARNED IMAGE |
|---|---|
| F01 | P101 TO P200, P12, P13, P16 |
| F02 | P201 TO P300 |
| F03 | P301 TO P400 |
| F04 | P401 TO P500 |
| F05 | P501 TO P600 |
| F06 | P5, P8, P11, P14, P15 |

LEARNED DATA TABLE

LEARNING DATA GENERATION APPARATUS, LEARNING MODEL GENERATION SYSTEM, LEARNING DATA GENERATION METHOD, AND NON-TRANSITORY STORAGE MEDIUM

CROSS-REFERENCE TO RELATED APPLICATIONS

This application is a Continuation of PCT International Application No. PCT/JP2019/009536 filed on Mar. 8, 2019 which claims the benefit of priority from Japanese Patent Application No. 2018-042291 filed on Mar. 8, 2018, the entire contents of both of which are incorporated herein by reference.

FIELD

The present application relates to a learning data generation apparatus, a learning model generation system, a learning data generation method, and a non-transitory storage medium.

BACKGROUND

In recent years, with practical application of a graphics processing unit (GPU) or the like, machine learning using deep learning has attracted attention. The deep learning is a technique for causing a multi-layered neural network to perform machine learning, and it is possible to improve accuracy by performing supervised learning on a large amount of learning data. For example, with use of the learning data, it is possible to assign a label to an object, such as an image, and classify the image. Here, to perform the supervised learning with high accuracy, it is necessary to prepare a large amount of learning data to which labels are assigned. For example, Japanese Laid-open Patent Publication No. 2017-111731 discloses a system in which, when a verification image is erroneously detected, a similar image is extracted from unlearned image data by an unsupervised image classifier, and the similar image is added as learning data. Further, Japanese Laid-open Patent Publication No. 2006-343791 discloses a method of increasing learning data by tracking a face region in a moving image.

However, in Japanese Laid-open Patent Publication No. 2017-111731, it is possible to improve classification accuracy of the verification image, but there is room for improvement in collection of learning data that is suitable for an object to be classified. Further, in Japanese Laid-open Patent Publication No. 2006-343791, it is possible to increase learning data with respect to a known label, but there is room for improvement in an increase in learning data that is suitable for an object not classified as a known label. Therefore, there is a need to appropriately collect learning data that is suitable for an object to be classified.

SUMMARY

A learning data generation apparatus, a learning model generation system, a learning data generation method, and a non-transitory storage medium are disclosed.

According to one aspect, there is provided a learning data generation apparatus comprising: an object extraction unit configured to extract an object image from an image; a classification evaluation unit configured to evaluate the object image based on a learned model and to thereby calculate reliability indicating a degree of posibility that the object image is classified as a candidate label; a classification determination unit configured to, if the reliability is smaller than a first threshold and equal to or larger than a second threshold which is smaller than the first threshold, associate a temporary label different from the candidate label with the object image; and a learning data generation unit configured to generate learning data based on the object image that is associated with the temporary label.

According to one aspect, there is provided a learning data generation method comprising: extracting an object image from an image; evaluating the object image based on a learned model and calculating reliability indicating a degree of possibility that the object image is classified as a candidate label; associating a temporary label different from the candidate label with the object image if the reliability is smaller than a first threshold and equal to or larger than a second threshold which is smaller than the first threshold; and generating learning data based on the object image that is associated with the temporary label.

According to one aspect, there is provided a non-transitory storage medium that stores a computer program for causing a computer to execute: extracting an object image from an image; evaluating the object image based on a learned model and calculating reliability indicating a degree of possibility that the object image is classified as a candidate label; associating a temporary label different from the candidate label with the object image if the reliability is smaller than a first threshold and equal to or larger than a second threshold which is smaller than the first threshold; and generating learning data based on the object image that is associated with the temporary label.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments of the present application will be described in detail below based on the drawings. The present application is not limited by the embodiments described below.

Figure 1:
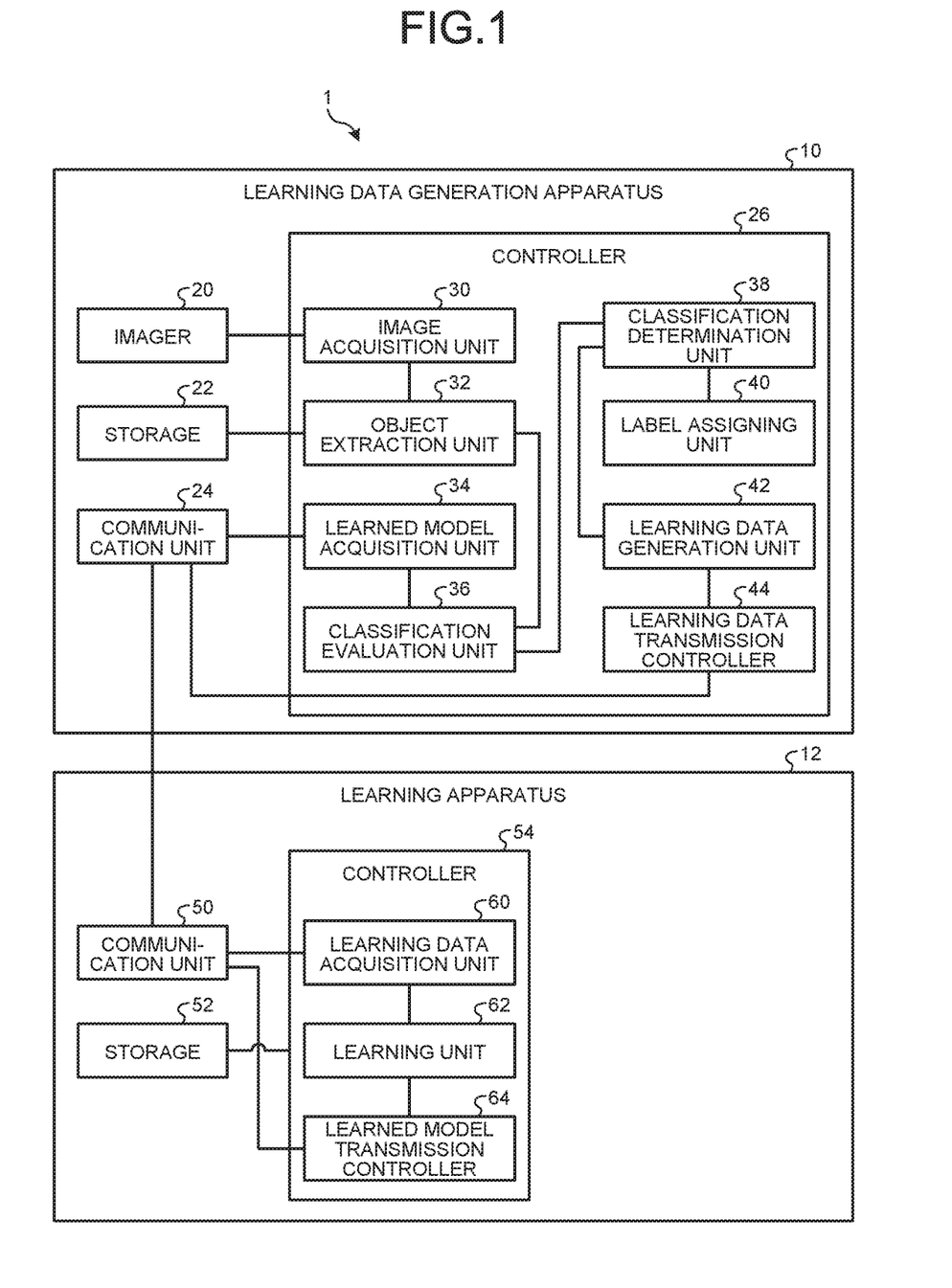
FIG. 1 is a schematic block diagram of an object classification system according to a present embodiment.

FIG. 1 is a schematic block diagram of an object classification system according to a present embodiment. An object classification system 1 according to the present embodiments is a system that classifies an object image by assigning a label to the object image based on a learned model. Further, the object classification system 1 improves classification accuracy of the object image by generating learning data and updating the learned model. That is, the object classification system 1 may be referred to as a learning model generation system.

As illustrated in FIG. 1, the object classification system 1 includes a learning data generation apparatus 10 and a learning apparatus 12. The learning data generation apparatus 10 is a terminal that is installed at a predetermined position in the present embodiment. The learning data generation apparatus 10 includes an imager 20, a storage 22, a communication unit 24, and a controller 26. Meanwhile, the learning data generation apparatus 10 may include, for example, an input unit that allows a user to perform input and an output unit that is able to output information. In this case, the input unit may be an input device, such as a button, that causes the imager 20 to capture an image, or may be a mouse, a keyboard, a touch panel, or the like. The output unit is, for example, a display and is able to display a captured image or the like.

The imager 20 is an imaging element that captures an image under a control of the controller 26. In the present embodiment, the imager 20 captures a moving image, but the imager 20 may capture a still image. As described above, the learning data generation apparatus 10 in the present embodiment is an imaging apparatus that includes the imager 20. However, the learning data generation apparatus 10 need not always include the imager 20. In this case, the learning data generation apparatus 10 may acquire an image from an external apparatus via communication. The imager 20 captures an image with image resolution of 1920×1080 and at a frame rate of 30 frames per second. However, imaging conditions, such as the resolution and the frame rate, are not limited to this example.

The storage 22 is a memory for storing information on calculation contents and programs of the controller 26, images captured by the imager 20, and the like. The storage 22 includes at least one external storage device, such as a random access memory (RAM), a read only memory (ROM), or a flash memory, for example.

The communication unit 24 transmits and receives data by performing communication with an external apparatus, e.g., the learning apparatus 12 in this example, under the control of the controller 26. The communication unit 24 is, for example, an antenna, and transmits and receives data to and from the learning apparatus 12 via radio communication using a wireless local area network (LAN), Wi-fi®, Bluetooth®, or the like. However, the communication unit 24 may be connected to the learning apparatus 12 via a cable, and transmit and receive information via wired communication.

The controller 26 is an arithmetic device, i.e., a central processing unit (CPU). The controller 26 includes an image acquisition unit 30, an object extraction unit 32, a learned model acquisition unit 34, a classification evaluation unit 36, a classification determination unit 38, a label assigning unit 40, a learning data generation unit 42, and a learning data transmission controller 44. The image acquisition unit 30, the object extraction unit 32, the learned model acquisition unit 34, the classification evaluation unit 36, the classification determination unit 38, the label assigning unit 40, the learning data generation unit 42, and the learning data transmission controller 44 perform processes described later by reading software (program) stored in the storage 22.

The image acquisition unit 30 controls the imager 20 and causes the imager 20 to capture images. The image acquisition unit 30 acquires the images captured by the imager 20. The image acquisition unit 30 stores the acquired images in the storage 22.

The object extraction unit 32 extracts an object image P from the images acquired by the image acquisition unit 30. The object image P is an image that is included in a partial region in a certain image, and is an image to be classified. For example, the object image P is a face image of a person who appears in a certain image. The object extraction unit 32 extracts multiple object images P from a single image. That is, if multiple face images are included in a certain image, the object extraction unit 32 extracts each of the face images as the object image P. Meanwhile, the object images P are not limited to the face images of persons, but may be arbitrary images as long as the object images P are images that are to be classified. Examples of the object images P include animals, plants, buildings, and various devices, such as vehicles.

The object extraction unit 32 extracts the object images P by detecting feature amounts of the image. The object extraction unit 32 is, for example, a device (Haar-like detector) that recognizes a face using Haar-like features, but may be a feature amount detector capable of recognizing a face using a different method. That is, the object extraction unit 32 may adopt an arbitrary extraction method as long as it is possible to extract the object images P. The object images P extracted by the object extraction unit 32 are stored in the storage 22.

The learned model acquisition unit 34 controls the communication unit 24 and acquires a learned model from the learning apparatus 12. The learned model acquisition unit 34 stores the acquired learned model in the storage 22. The learned model according to the present embodiments is configured with a model (configuration information on the neural network) which defines the neural network constituting classifiers that are learned through deep learning, and variables. The learned model is able to recreate a neural network that obtain the same classification result if the same input data is input. The deep learning is a learning method for causing a deep neural network to perform learning by back propagation (error back propagation algorithm).

Figure 2:
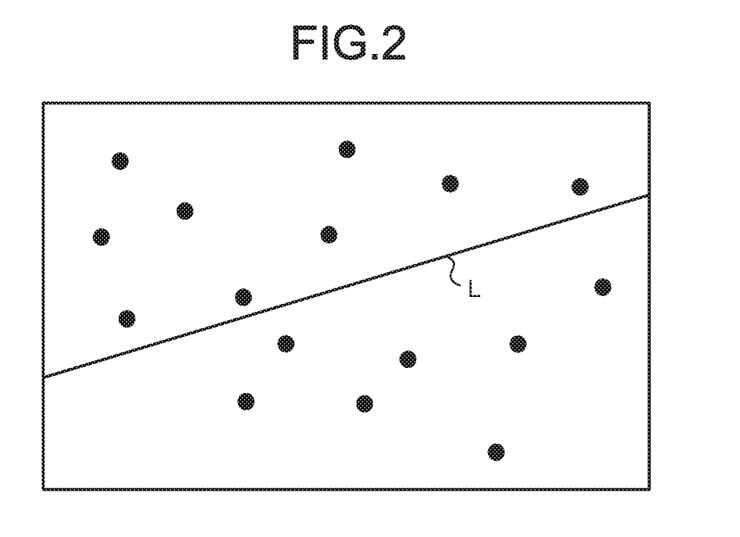
FIG. 2 is a diagram schematically illustrating a concept of classification by a learned model.

FIG. 2 is a diagram schematically illustrating a concept of classification by the learned model. The classification evaluation unit 36 reads the learned model from the storage 22, and classifies the object image P by using the learned model. More specifically, the classification evaluation unit 36 calculates possibility (reliability described later) that the object image P is classified as a candidate label for each of the candidate labels by using the learned model. The classification evaluation unit 36 inputs the object image P as input data to the learned model. Accordingly, the learned model extracts multiple kinds of feature amounts from the object image P, and calculates a degree of posibility that the object image P is classified as each of the candidate labels based on the feature amounts. More specifically, the learned model is configured with a multi-layered neural network, and classifies the object image P by extracting different feature amounts for the respective layers. That is, in the learned model, if, for example, classification into two candidate labels is to be performed, as illustrated in FIG. 2, it is determined whether the object image P is classified as either one of the candidate labels based on whether the extracted feature amounts of the object image P are equal to or larger than a set boundary line L or equal to or smaller than the set boundary line L. In the present embodiment, a convolutional neural network (CNN) is adopted as a model that is used as the learned model, for example. In the CNN, multiple convolutional layers and multiple pooling layers are set in intermediate layers for extracting feature amounts of the input data, and a fully connected layer is set in a final layer for classifying the input data. However, a classification model and a classification method of the learned model may be arbitrary as long as the object image P is classified based on the feature amounts of the object image P. The deep learning may be implemented by software so as to be operated by a CPU, a GPU, or the like by using a deep learning framework, such as TensorFlow(Registered Trademark).

In the present embodiment, the classification evaluation unit 36 evaluates (analyzes) the object image P based on the learned model, and calculates reliability for each of the candidate labels. The reliability is an index, in this example, a value, that indicates a degree of posibility that the object image P is classified as each of the candidate labels. For example, the reliability is equal to or larger than 0 and equal to or smaller than 1, and a sum of the reliability of all of the labels is 1. In this case, the reliability may be represented as posterior posibility. Further, the candidate labels are labels that are set in advance in the learned model. Each of the object images P may be different types of face images, and the candidate labels are labels indicating the types of the object images P. Therefore, the classification evaluation unit 36 calculates, as the reliability, posibility that the object image P corresponds to each of the types. In the present embodiment, the candidate label is set for each individual (same person). That is, one single candidate label indicates a face of one individual, and another candidate label indicates a face of another individual. However, the candidate labels are not limited to individuals, but may be set arbitrarily as long as the labels indicate the types of the object images P. For example, the candidate labels may be ages, genders, races, or the like of a person. Further, the candidate labels may be types of animals, types of plants, types of buildings, or types of various devices, such as vehicles.

Figure 3:
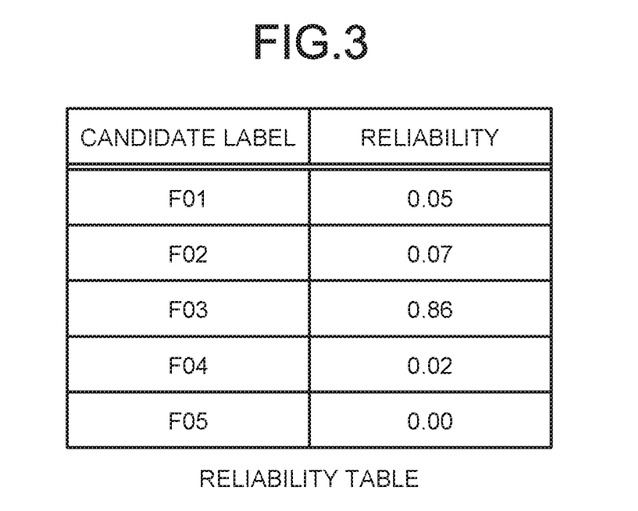
FIG. 3 is a diagram illustrating an example of a reliability table.

FIG. 3 is a diagram illustrating an example of a reliability table. The classification evaluation unit 36 calculates the reliability of the object image P for each of the candidate labels, and generates the reliability table as illustrated in FIG. 3. In the example illustrated in FIG. 3, candidate labels F01, F02, F03, F04, and F05 are set as the candidate labels. In the present embodiment, the candidate labels F01, F02, F03, F04, and F05 indicate different individuals. In the example in FIG. 3, the reliability are set to 0.05, 0.07, 0.86, 0.02, and 0.00 in order from the candidate label F01 to the candidate label F05. The reliability are set such that a sum of the reliability of all of the candidate labels is 1. Therefore, in the example in FIG. 3, the classification evaluation unit 36 determines the posibility that the object image P is classified as the candidate label F01 is 5%, the posibility that the object image P is classified as the candidate label F02 is 7%, the posibility that the object image P is classified as the candidate label F03 is 86%, the posibility that the object image P is classified as the candidate label F04 is 2%, and the posibility that the object image P is classified as the candidate label F05 is 0%.

The classification evaluation unit 36 stores the reliability calculated as above in the storage 22 in association with the object image P. The classification evaluation unit 36 calculates the reliability for each of the object images P.

Figure 4:
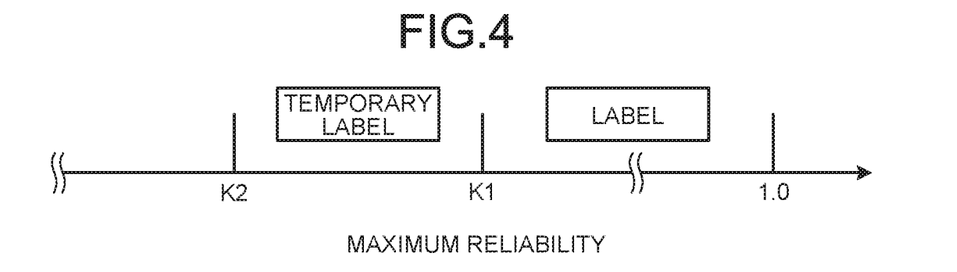
FIG. 4 is a diagram for explaining determination by a classification determination unit.

FIG. 4 is a diagram for explaining determination by the classification determination unit. The classification determination unit 38 determines whether the object image P is classified as the candidate labels based on the reliability calculated by the classification evaluation unit 36. Specifically, the classification determination unit 38 extracts the candidate label with the highest reliability from among the multiple candidate labels, and determines whether the object image P is classified as the extracted candidate label. Hereinafter, the reliability of the candidate label with the highest reliability is referred to as a maximum reliability. In the example in FIG. 3, the candidate label with the highest reliability is the candidate label F03, and the maximum reliability is the reliability of the candidate label F03, which is 0.86.

As illustrated in FIG. 4, if the maximum reliability is equal to or larger than a first threshold K1, the classification determination unit 38 determines that the object image P is classified as the candidate label with the maximum reliability. It is preferable to set the first threshold K1 based on the number of classifications and the number of learned images in the learned model. However, in this example, the first threshold K1 is set to 0.85, but not limited thereto, and may be set arbitrarily. For example, it is preferable to reduce the first threshold K1 with an increase in the number of classifications, and increase the first threshold K1 with an increase in the number of learned images in the learned model. The classification determination unit 38 transmits a determination result indicating that the object image P is classified as said candidate label to the label assigning unit 40. The label assigning unit 40 assigns said candidate label as a label of the object image P. That is, the label assigning unit 40 adopts said candidate label as an official label, and determines that the object image P is classified as this label. For example, if the first threshold K1 is set to 0.85, the object image P3 in FIG. 3 is determined as being classified as the candidate label F03. The label assigning unit 40 assigns the candidate label F03 as the official label F03 to the object image P. That is, the object image P is classified as a face image of an individual with the candidate label F03 (the label F03).

In contrast, if the maximum reliability is smaller than the first threshold K1, the classification determination unit 38 determines that the object image P is not classified as said candidate label. Further, if the maximum reliability is smaller than the first threshold K1, the classification determination unit 38 determines whether the maximum reliability is equal to or larger than a second threshold K2. As illustrated in FIG. 4, the second threshold K2 is smaller than the first threshold K1. It is preferable to set the second threshold K2 based on the number of classifications and the number of learned images in the learned model. However, in this example, the second threshold K2 is set to 0.7, but may be set to an arbitrary value that is smaller than the first threshold K1. Meanwhile, it is preferable to reduce an interval between the first threshold K1 and the second threshold K2 with an increase in the number of unknown new individuals (classifications), and increase the interval between the first threshold K1 and the second threshold K2 with an increase in the number of learned images in the learned model. Meanwhile, it may be possible to set the first threshold K1 and the second threshold K2 to the same value. The classification determination unit 38 associates a temporary label with the object image P if the maximum reliability is smaller than the first threshold K1 and equal to or larger than the second threshold K2. The temporary label is set for each of the candidate labels, and is a label of a different type from the candidate labels. That is, if the maximum reliability is smaller than the first threshold K1 and equal to or larger than the second threshold K2, the classification determination unit 38 associates the object image P with the temporary label other than the candidate labels, without classifying the object image P as the candidate labels. In other words, the classification determination unit 38 temporarily associates an unknown new individual other than the individuals indicated by the candidate labels, without classifying the object image P as the individuals indicated by the candidate labels. For example, if the reliability (maximum reliability) of the candidate label F03 in FIG. 3 is smaller than the first threshold K1 and equal to or larger than the second threshold K2, the object image P is associated with a temporary label different from the candidate labels F01 to F05.

If the maximum reliability is smaller than the second threshold K2, the classification determination unit 38 does not associate the object image P with the candidate labels and the temporary label. That is, if the maximum reliability is smaller than the second threshold K2, the classification determination unit 38 does not classify the object image P. Further, if the maximum reliability is smaller than the second threshold K2, the classification determination unit 38 does not use the object image P as learning data as described later. However, the classification determination unit 38 may set only the first threshold K1 without setting the second threshold K2, and use the object image P as the learning data.

Figure 5:
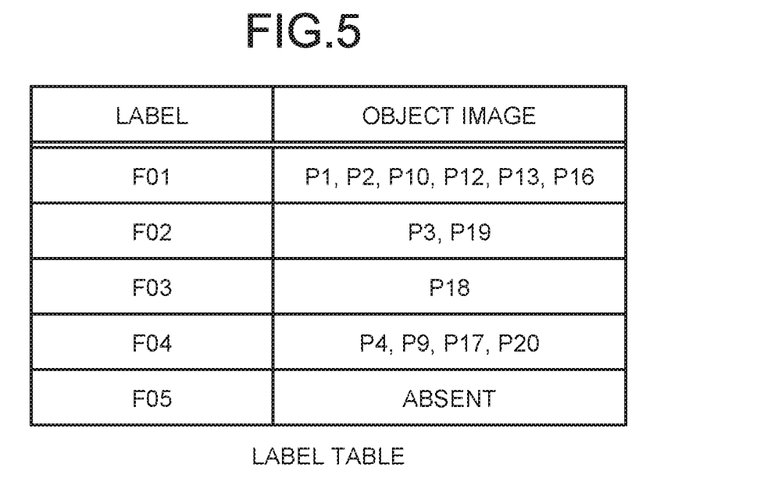
FIG. 5 is a diagram illustrating an example of a label table.

FIG. 5 is a diagram illustrating an example of a label table. The classification determination unit 38 performs the determination as described above for each of the object images P. The label assigning unit 40 stores the label that is determined as the official label and the object image P in an associated manner in the storage 22. FIG. 5 illustrates one example of the label table as information that indicates associations between the labels and the object images P. FIG. 5 illustrates an example in which determination is performed on an object image P1 to an object image P20. In the example in FIG. 5, the object images P1, P2, P10, P12, P13, and P16 are the object images P for which the candidate label F01 is determined as the official label F01. Further, the object images P3 and P19 are the object images P for which the candidate label F02 is determined as the official label F02, and the object image P18 is the object image P for which the candidate label F03 is determined as the official label F03. Furthermore, the object images P4, P9, P17, and P20 are the object images P for which the candidate label F04 is determined as the official label F04, and no object image P is present for which the candidate label F05 is determined as the official label F05. In this manner, the object images P to which no labels are assigned are present among the object images P1 to the object image P20.

Figure 6:
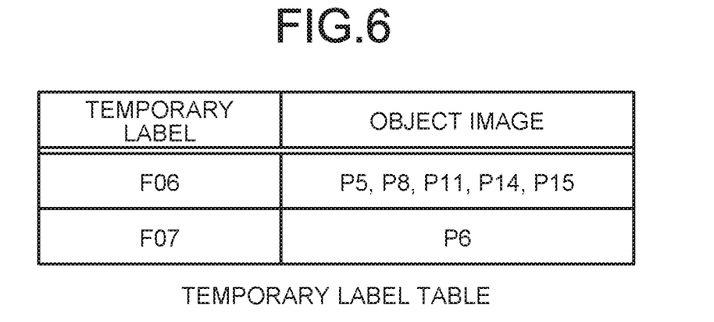
FIG. 6 is a diagram illustrating an example of a temporary label table.

FIG. 6 is a diagram illustrating an example of a temporary label table. The classification determination unit 38 stores the temporary labels and the object images P in an associated manner in the storage 22. Here, the candidate label determined as having the maximum reliability may vary for each of the object images P. In this case, the classification determination unit 38 sets a temporary label for each of the candidate labels that are determined as having the maximum reliability. FIG. 6 illustrates one example of the temporary label table as information in which the temporary labels and the object images P are associated. For example, in FIG. 6, the classification determination unit 38 determines a temporary label F06 as a temporary label that is adopted when the candidate label F01 is determined as having the maximum reliability, and determines a temporary label F07 as a temporary label that is adopted when the candidate label F02 is determined as having the maximum reliability. That is, when the classification determination unit 38 associates the temporary labels, and if the candidate labels determined as having the maximum reliability are different, the classification determination unit 38 associates different temporary labels (different individuals). Further, when the classification determination unit 38 associates the temporary label, and if the candidate labels determined as having the maximum reliability are the same, the classification determination unit 38 associates the same temporary label. In the example in FIG. 6, the object images P5, P8, P11, P14, and P15 are the object images P that are associated with the temporary label F06, and the object image P6 is the object image P that is associated with the temporary label F07.

If the number of the object images P that are associated with the same temporary label becomes equal to or larger than a predetermined number, the classification determination unit 38 determines that the object images P are classified as the temporary label. Then, the classification determination unit 38 transmits a determination result indicating that the object images P are classified as the temporary label to the label assigning unit 40. The label assigning unit 40 assigns the temporary label as the labels of the object images P. That is, the label assigning unit 40 adopts the temporary label as the official label, and determines that the object images P are classified as the said label. In this manner, if the number of the object images P that are associated with the temporary label becomes equal to or larger than the predetermined number, the label assigning unit 40 assigns a different label (temporary label) different from the already set candidate labels to the object images P. Meanwhile, the predetermined number in this example is set to 5 for example, but is not limited thereto, and may be set arbitrarily.

Figure 7:
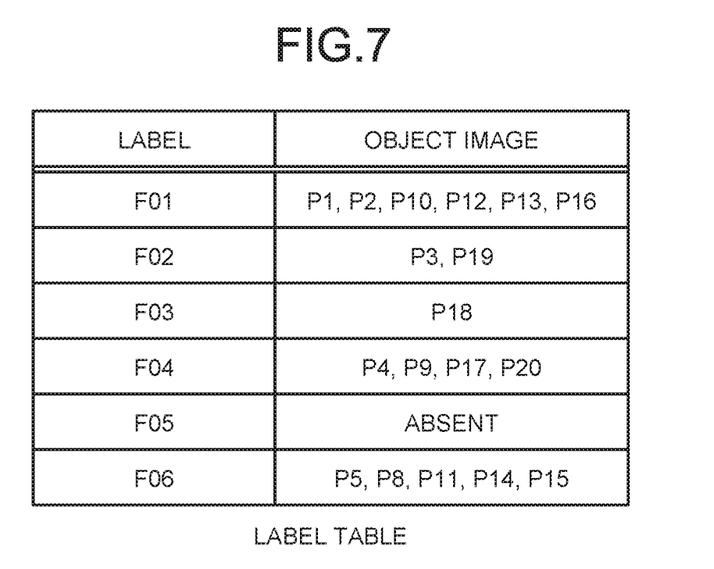
FIG. 7 is a diagram illustrating an example of the label table.

FIG. 7 is a diagram illustrating an example of the label table. As described above, if the temporary label is adopted as the official label, the number of labels in the label table increases. FIG. 7 illustrates the label table in a case where the temporary label F06 is added as the official label to the label table in FIG. 5. As illustrated in FIG. 7, the temporary label F06 is set as the official label F06, and the object images P5, P8, P11, P14, and P15 are the object images P that are classified as the label F06. The temporary label F07 is not adopted as the official label because the number of associated object images P is smaller than the predetermined number.

Referring back to FIG. 1, the learning data generation unit 42 generates learning data for updating the learned model based on the determination result obtained by the classification determination unit 38. If the number of the object images P that are associated with the temporary label by the classification determination unit 38 becomes equal to or larger than the predetermined number, the learning data generation unit 42 adopts the object images P and the temporary label as the learning data. That is, if the number of the object images P that are associated with the temporary label becomes equal to or larger than the predetermined number and the temporary label is therefore assigned as the official label, the learning data generation unit 42 generates the learning data by associating the temporary label with each of the object images P. Here, the learning data indicates supervised data and is data that includes information indicating that the object images P are classified as the temporary label. In the example in FIG. 6, the object images P5, P8, P11, P14, and P15 are associated with the temporary label F06, and adopted as the learning data.

The learning data transmission controller 44 illustrated in FIG. 1 controls the communication unit 24 and transmits the learning data generated by the learning data generation unit 42 to the learning apparatus 12. The learning data generation unit 42 deletes the object images P that are used as the learning data from the temporary label table stored in the storage 22. That is, in the example in FIG. 6, the object images P5, P8, P11, P14, and P15 that are associated with the temporary label F06 and that are adopted as the learning data are deleted. Therefore, only the object image P6 associated with the temporary label F07 remains in the temporary label table. However, if any of the object images P is adopted as the learning data, the learning data generation unit 42 may delete all of the object images P in the temporary label table. In this case, the object image P6 associated with the temporary label F07 is also deleted. In this case, when next classification is to be started, it is possible to perform classification and set a temporary label with high accuracy by using a new learned model in which the learning data is reflected. In contrast, if only the object images P that are used as the learning data are deleted, the object images P associated with other temporary labels remain. Therefore, in this case, the number needed to reach the predetermined number is small, so that it is possible to generate the learning data more promptly.

The learning data generation apparatus 10 is configured as described above. Next, the learning apparatus 12 will be described. As illustrated in FIG. 1, the learning apparatus 12 is an apparatus (server) that is installed at a different position from the learning data generation apparatus 10. The learning apparatus 12 includes a communication unit 50, a storage 52, and a controller 54. Meanwhile, the learning apparatus 12 may include, for example, an input unit that allows a user to perform input and an output unit that is able to output information. In this case, the input unit may be a mouse, a keyboard, a touch panel, or the like. The output unit is, for example, a display and is able to display a captured image or the like.

The communication unit 50 transmits and receives data by performing communication with an external apparatus, e.g., the learning data generation apparatus 10 in this example, under a control of the controller 54. The communication unit 50 is, for example, an antenna, and transmits and receives data to and from the learning data generation apparatus 10 via radio communication using a wireless LAN, Wi-fi®, Bluetooth®, or the like. However, the communication unit 50 may be connected to the learning data generation apparatus 10 via a cable, and transmit and receive information via wired communication.

The storage 52 is a memory for storing information on calculation contents and programs of the controller 54. The storage 52 includes at least one external storage device, such as a random access memory (RAM), a read only memory (ROM), and a flash memory, for example.

The controller 54 is an arithmetic device, i.e., a central processing unit (CPU). The controller 54 includes a learning data acquisition unit 60, a learning unit 62, and a learned model transmission controller 64. The learning data acquisition unit 60, the learning unit 62, and the learned model transmission controller 64 perform processes as described later by reading software (program) stored in the storage 52.

The learning data acquisition unit 60 controls the communication unit 50 and acquires the learning data generated by the learning data generation unit 42 from the communication unit 24 of the learning data generation apparatus 10. The learning data acquisition unit 60 stores the acquired learning data in the storage 52.

The learning unit 62 updates the learned model by learning. The learning unit 62 reads the learned model and the learned learning data that are stored in advance in the storage 52, and reads new learning data that is acquired by the learning data acquisition unit 60. The learning unit 62 updates the learned model by causing the learned model to learn the learned learning data and the new learning data as supervised data.

Figure 8:
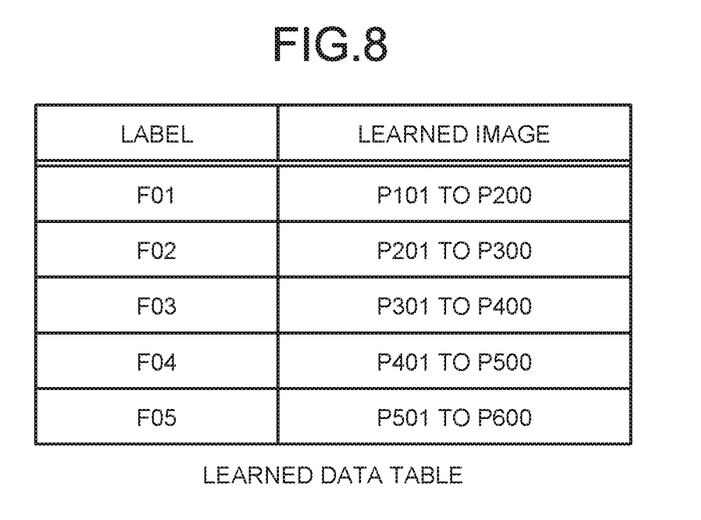
FIG. 8 is a diagram illustrating an example of a learned data table.
Figure 9:
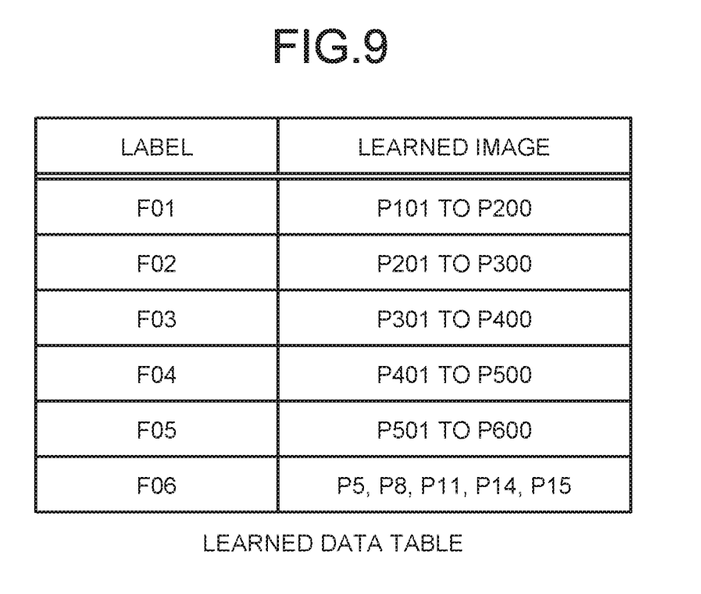
FIG. 9 is a diagram illustrating an example of the learned data table.

FIG. 8 and FIG. 9 are examples of a learned data table. FIG. 8 is one example of the learned data table before update. The learned data table is supervised data that is stored in the storage 52, and is information in which learned images are associated with labels. That is, the learned data table is a data group that includes multiple pieces of teaching data indicating the labels into which the learned images are classified. The learned model is learned and constructed by using each piece of the data in the learned data table as teaching data.

FIG. 8 illustrates one example of the learned data before update with the learning data obtained from the learning data generation unit 42. In the learned data table illustrated in FIG. 8, learned images P101 to P200 are classified as the label F01, learned images P201 to P300 are classified as the label F02, learned images P301 to P400 are classified as the label F03, learned images P401 to P500 are classified as the label F04, and learned images P501 to P600 are classified as the label F05. The learned images P100 to P600 are face images that are extracted in advance, and are images for which the labels to be classified are set in advance without being classified by the learning data generation apparatus 10. That is, the learned model is constructed by being supplied with the learned images P100 to P600 in advance as supervised data.

FIG. 9 illustrates one example of the leaned data table after update with the learning data obtained from the learning data generation unit 42. As illustrated in FIG. 9, the learning unit 62 updates the learned data table by adding the learning data to the learned data table that is not yet updated. That is, the learning unit 62 updates the learned data table by adding the object images P of the learning data as learned images and the temporary label as a new label in the learned data table. That is, the learning data is supervised data that indicates an association between the temporary labels and the object images P. In the example in FIG. 9, the new learned images (object images) P5, P8, P11, P14, and P15 included in the learning data are added to the learned data table, and the new label F06 is associated with the learned images. The learning unit 62 updates the learned model by using the learned data table to which the new learning data is added as described above. The learning unit 62 stores the updated learned model in the storage 52.

Referring back to FIG. 1, the learned model transmission controller 64 controls the communication unit 50 and transmits the updated learned model to the learning data generation apparatus 10. In the learning data generation apparatus 10, the learned model acquisition unit 34 reads the updated learned model and performs classification of a next object image P and generation of the learning data.

The learning apparatus 12 is a server that is installed at a position separated from the learning data generation apparatus 10 as described above. However, the learning apparatus 12 may be incorporated in the learning data generation apparatus 10. That is, the object classification system 1 may be configured such that the learning apparatus 12 is not included but the learning data acquisition unit 60 and the learning unit 62 are incorporated in the controller 26 of the learning data generation apparatus 10. In this case, the learning data transmission controller 44 is also not needed. Further, in the present embodiment, the learning data generation apparatus 10 causes the classification determination unit 38 to perform determination, but the learning apparatus 12 may include the classification determination unit 38 and perform determination. Furthermore, the learning apparatus 12 may include the classification evaluation unit 36 and calculate the reliability.

Moreover, the object classification system 1 may of course be implemented as an apparatus using hardware, such as a CPU, an FPGA, an ASIC, or a memory, and may be implemented by firmware stored in a ROM, a flash memory, or the like or by software, such as a computer. A firmware program and a software program may be provided by being recorded in a medium that is readable by a computer or the like, may be transmitted and received to and from a server via a wired or wireless network, or may be transmitted and received as data broadcasting via terrestrial broadcasting or satellite digital broadcasting.

Figure 10:
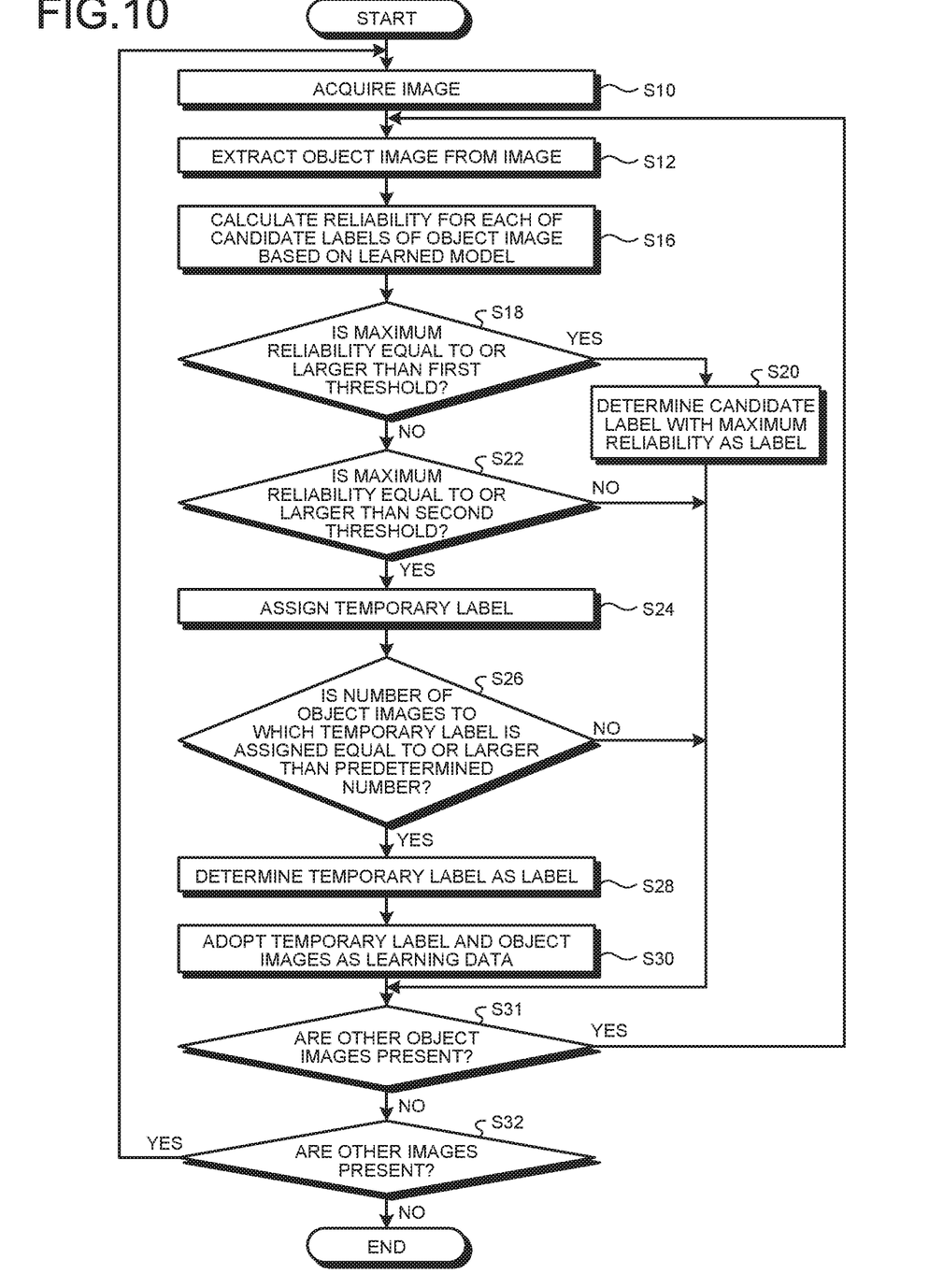
FIG. 10 is a flowchart for explaining a flow of processes performed by a controller of a learning data generation apparatus.

A processing flow of processes performed by the object classification system 1 as described above will be described using a flowchart. FIG. 10 is a flowchart for explaining a flow of processes performed by the controller of the learning data generation apparatus. As illustrated in FIG. 10, the controller 26 of the learning data generation apparatus 10 causes the image acquisition unit 30 to acquire an image captured by the imager 20 (Step S10), and causes the object extraction unit 32 to extract a single object image P from the acquired image (Step S12).

The controller 26 causes the classification evaluation unit 36 to calculate the reliability for each of the candidate labels of the object image P based on the learned model (Step S16). Then, the controller 26 causes the classification determination unit 38 to determine whether the maximum reliability is equal to or larger than the first threshold K1 (Step S18). The maximum reliability is the reliability of the candidate label with the highest reliability among the candidate labels. If the maximum reliability is equal to or larger than the first threshold K1 (Step S18; Yes), the classification determination unit 38 determines that the object image P is classified as the candidate label with the maximum reliability, and the label assigning unit 40 determines the candidate label with the maximum reliability as the label of the object image P (Step S20). After the candidate label with the maximum reliability is determined as the label, the process proceeds to Step S31 described later.

If the maximum reliability is not equal to or larger than the first threshold K1 (Step S18; No), that is, if the maximum reliability is smaller than the first threshold K1, the classification determination unit 38 determines whether the maximum reliability is equal to or larger than the second threshold K2 (Step S22). If the maximum reliability is not equal to or larger than the second threshold K2 (Step S22; No), that is, if the maximum reliability is smaller than the second threshold, the process proceeds to Step S31. If the maximum reliability is equal to or larger than the second threshold K2 (Step S22; Yes), the classification determination unit 38 assigns a temporary label to the object image P (Step S24).

Then, the classification determination unit 38 determines whether the number of the object images P to which the temporary label is assigned is equal to or larger than a predetermined number (Step S26), and if the number is not equal to or larger than the predetermined number (Step S26; No), the process proceeds to Step S31. In contrast, if the number of the object images P to which the temporary label is assigned is equal to or larger than the predetermined number (Step S26; Yes), the label assigning unit 40 determines the temporary label as the label (Step S28), and the learning data generation unit 42 adopts the temporary label and the object images P as the learning data (Step S30). Thereafter, the process proceeds to Step S31, at which the object extraction unit 32 determines whether other object images P are present in the image (Step S31). If the other object images P are present (Step S31; Yes), the process returns to Step S12, and the object extraction unit 32 extracts one of the other object images P. If the other object images P are not present (Step S31; No), the process proceeds to Step S32, and the controller 26 determines whether other images are present (Step S32). If the other images are present (Step S32; Yes), the process returns to Step S10. If the other images are not present (Step S32; No), the process is ended. Thereafter, the controller 26 causes the learning data transmission controller 44 to transmit the learning data to the learning apparatus 12, and the learning apparatus 12 updates the learned model based on the learning data. The controller 26 subsequently performs the above-described process using the updated learned model.

As described above, the learning data generation apparatus 10 according to the present embodiments includes the image acquisition unit 30 that acquires the image, the object extraction unit 32 that extracts the object image P from the image, the classification evaluation unit 36, the classification determination unit 38, and the learning data generation unit 42. The classification evaluation unit 36 evaluates the object image P based on the learned model, and calculates the reliability indicating the degree of the posibility that the object image P is classified as the candidate label. The classification determination unit 38 associates the temporary label that is different from the candidate label with the object image P if the reliability is smaller than the first threshold K1 and is equal to or larger than the second threshold K2 that is smaller than the first threshold K1. Then, the learning data generation unit 42 generates the learning data based on the object image that is associated with the temporary label. Further, the classification determination unit 38 determines whether the object image P is classified as the candidate label by performing the determination based on the reliability. The learning data generation unit 42 generates the learning data for updating the learned model based on the determination result of the classification determination unit 38. The classification determination unit 38 determines that the object image P is classified as the candidate label if the reliability is equal to or larger than the first threshold K1, and associates the temporary label that is set for the candidate label with the object image P if the reliability is smaller than the first threshold K1 and is equal to or larger than the second threshold K2. If the number of the object images P associated with the temporary label becomes equal to or larger than the predetermined number, the learning data generation unit 42 adopts each of the object images P and the temporary label as the learning data. With this configuration, it is possible to assign the temporary label and improve the accuracy of the learning data. Further, if the reliability becomes equal to or larger than the first threshold K1, the candidate label and the object image P are not adopted as the learning data, so that it is possible to eliminate the images that are used in machine learning in advance as premise for the machine learning, and to improve efficiency of the machine learning.

Here, when a learned model is constructed by the machine learning, such as deep learning, in some cases, supervised data for which a solution is known may be used. In this case, accuracy increases with an increase in the number of pieces of supervised data. Therefore, it is needed to appropriately collect pieces of the supervised data. In contrast, the learning data generation apparatus 10 according to the present embodiments analyzes the object image P to be classified, and assigns a temporary label. Then, it is determined that the object image P is classified as the temporary label and adopted as the learning data (supervised data). Therefore, the learning data generation apparatus 10 generates the learning data by using the image to be classified, so that it is possible to appropriately generate the learning data suitable for an object to be classified.

Furthermore, by assigning a new label as the temporary label and performing supervised learning on the images that have not been classified by the learned model before update, the learning data generation apparatus 10 is able to increase the number of classifications after update (after relearning). Meanwhile, in the present embodiment, even if the learned model is updated, the values of the first threshold K1 and the second threshold K2 for assigning the temporary label or the like are set constant. However, the learning data generation apparatus 10 may change the values of the first threshold K1 and the second threshold K2 after the update of the learned model. For example, if the number of the candidate labels exceeds a predetermined number due to the update of the learned model, the learning data generation apparatus 10 may reduce the values of the first threshold K1 and the second threshold K2. With this configuration, even if the number of classifications increases, it is possible to perform the classification in a preferred manner.

Furthermore, the classification evaluation unit 36 calculates the reliability for the candidate labels of multiple kinds. The classification determination unit 38 sets the temporary label for each of the candidate labels, and associates the object image P with the temporary label that is set for the candidate label with the highest reliability. The learning data generation apparatus 10 associates the temporary label that is set for the candidate label with the highest reliability among the multiple candidate labels. Therefore, according to the learning data generation apparatus 10, it is possible to appropriately perform the classification, appropriately assign the temporary label, and improve the accuracy of the learning data.

Moreover, the learning data generation apparatus 10 includes the label assigning unit 40 that assigns the label to the object image P. If it is determined that the object image P is classified as the candidate label, the label assigning unit 40 assigns the candidate label as a label of the object image P. If the number of the object images P associated with the temporary label becomes equal to or larger than the predetermined number, the label assigning unit 40 assigns the temporary label as the label of the object images P. The learning data generation apparatus 10 as described above determines that a label with the reliability equal to or larger than the first threshold K1 is the label, and determines, after multiple pieces of data are accumulated, that a label with the reliability smaller than the first threshold K1 and equal to or larger than the second threshold K2 is the label. Therefore, it is possible to improve accuracy in setting an unknown label.

Furthermore, the learning model generation system (the object classification system 1) according to the present embodiments includes the learning data generation apparatus 10, and the learning unit 62 that performs the machine learning based on the learning data generated by the learning data generation unit 42 and updates the learned model. The learning model generation system generates the learned model based on the learning data generated by the learning data generation apparatus 10. The learning model generation system updates the learning model based on the learning data, so that it is possible to construct the learning model that is suitable for the object to be classified.

Moreover, the learning unit 62 performs the machine learning by deep learning. Therefore, the learning model generation system is able to construct a highly accurate learning model.

Furthermore, the object classification system 1 according to the present embodiment includes the learning data generation apparatus 10 and classifies the object image P by using the learned model. Therefore, the object classification system 1 is able to appropriately classify the object image P.

Figure 11:
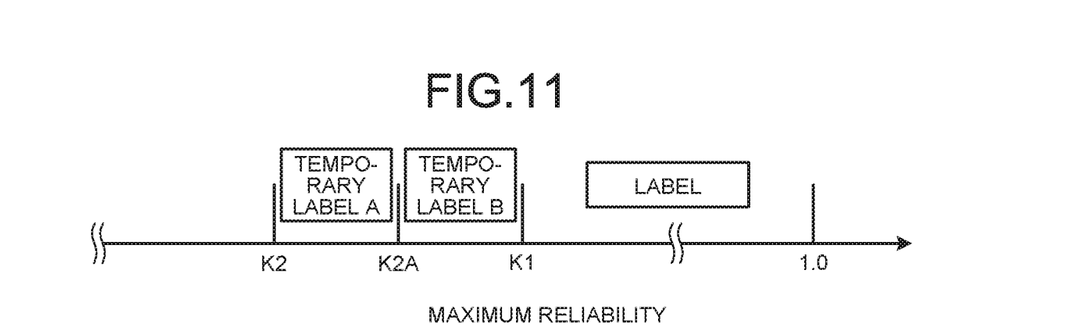
FIG. 11 is a diagram for explaining determination by a classification determination unit in another example of the present embodiment.

FIG. 11 is a diagram for explaining the determination performed by the classification determination unit according to another example of the present embodiment. In the present embodiment, the classification determination unit 38 sets a single temporary label for a single candidate label, but it may be possible to set multiple temporary labels for a single candidate label. The example in FIG. 11 is an example in which temporary labels A and B are assigned to a single candidate label. As illustrated in FIG. 11, if the maximum reliability is smaller than the first threshold K1 and equal to or larger than a threshold K2A, the classification determination unit 38 associates the temporary label B with the object image P. The threshold K2A is smaller than the first threshold K1 and larger than the second threshold K2. Further, if the maximum reliability is smaller than the threshold K2A and equal to or larger than the second threshold K2, the classification determination unit 38 associates the temporary label A with the object image P. In this manner, the classification determination unit 38 may divide a range assigned for the maximum reliability of a single candidate label into multiple divided ranges, and set a temporary label for each of the multiple divided ranges. Meanwhile, it may be possible to set one of the first threshold K1 and the second threshold K2 to the same value as the threshold K2A.

Here, for example, when the reliability of the first threshold K1 is not always high as in a case where the number of the learned images in the learned model is smaller than a predetermined number, and if the maximum reliability is smaller than the first threshold K1 and equal to or larger than the threshold K2A, it may be possible not to assign the temporary label to the object image P.

In this manner, if the reliability is equal to or larger than an intermediate threshold (threshold K2A), which is smaller than the first threshold K1 and larger than the second threshold K2, and smaller than the first threshold K1, the classification determination unit 38 associates a first temporary label (the temporary label B) that is different from the candidate label with the object image P. If the reliability is equal to or larger than the second threshold K2 and smaller than the intermediate threshold (the threshold K2A), the classification determination unit 38 associates a second temporary label (the temporary label A) that is different from the first temporary label with the object image P. By setting the temporary label for each of the multiple divided ranges as described above, it is possible to perform the classification with high accuracy.

Figure 12:
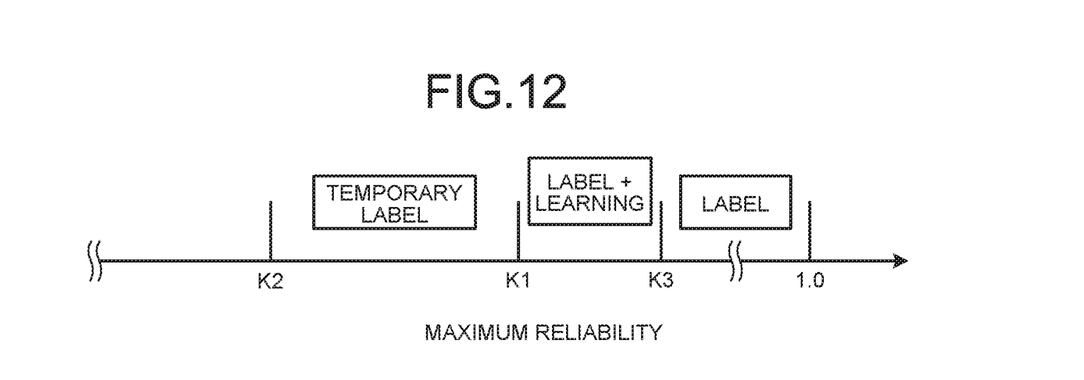
FIG. 12 is a diagram for explaining determination by the classification determination unit in another example of the present embodiment.

FIG. 12 is a diagram for explaining the determination performed by the classification determination unit in another example of the present embodiment. In the present embodiment, if the maximum reliability is larger than the first threshold K1, the classification determination unit 38 assigns the label but does not use the object image as the learning data. However, the classification determination unit 38 may use, as the learning data, the object image to which the label is assigned. In this case, as illustrated in FIG. 12, the classification determination unit 38 assigs, as the official label, a candidate label with the maximum reliability to the object image P if the maximum reliability is equal to or larger than the third threshold K3 and smaller than 1. Furthermore, the classification determination unit 38 uses the object image P and the candidate label with the maximum reliability as the learning data if the maximum reliability is equal to or larger than the first threshold K1 and smaller than a third threshold K3. The third threshold K3 is larger than the first threshold K1. In contrast, if the maximum reliability is equal to or larger than the third threshold K3, the classification determination unit 38 assigns the candidate label with the maximum reliability as the official label to the object image P, but does not use the object image P and the candidate label as the learning data.

Figure 13:
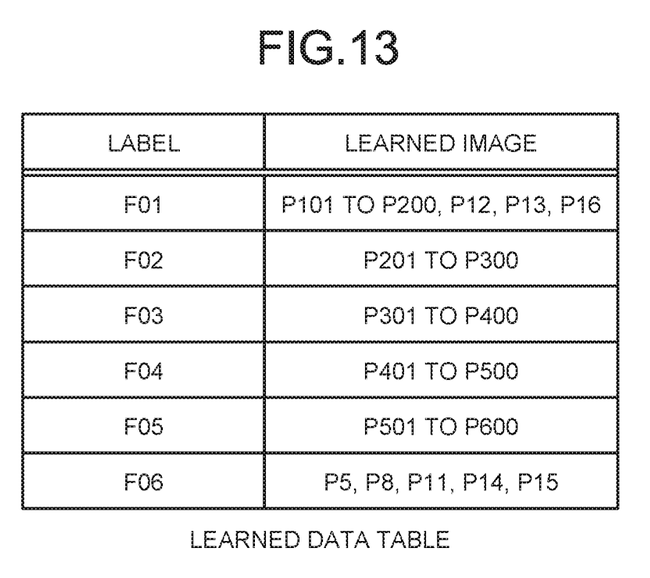
FIG. 13 is a diagram illustrating an example of a learned data table in another example of the present embodiment.

FIG. 13 is a diagram illustrating an example of the learned data table in another example of the present embodiment. FIG. 13 illustrates an example in which the candidate label F01 is a candidate label with the maximum reliability for the object images P12, P13, and P16, and in which the maximum reliability is equal to or larger than the first threshold K1 and smaller than the third threshold K3. In this case, the object images P12, P13, and P16 are associated with the candidate label F01 and added, as learning data (supervised data), to the learned data table. Therefore, the learned data table illustrated in FIG. 13 includes data indicating that the learned images P12, P13, and P16 are associated with the label F01, in addition to the data illustrated in FIG. 10. Consequently, the learning unit 62 is able to construct the learned model with high classification accuracy by using the learned images P12, P13, and P16.

In this manner, if the reliability is smaller than the third threshold K3 which is larger than the first threshold K1, and equal to or larger than the first threshold K1, the classification determination unit 38 associates the object image P with the candidate label. Then, the learning data generation unit 42 generates the learning data based on the object image P associated with the temporary label or the candidate label. In this manner, the learning data generation unit 42 may adopt, as the learning data, the candidate label with the reliability that is higher than the first threshold K1 and lower than the third threshold K3 that is higher than the first threshold K1 and the object image P. Further, it may be possible for the learning data generation unit 42 not to adopt the candidate label with the reliability that is equal to or larger than the third threshold K3 and the object image P as the learning data. The learning data generation apparatus 10 determines that data is not needed for new learning and does not adopt the data as learning data if the reliability is adequately high, e.g., if the reliability is equal to or larger than the third threshold K3, and determines that data is suitable for improvement of accuracy of the learning model and uses the data as learning data if the reliability is adequate but is not as high as the third threshold K3. Therefore, by using only data that is appropriate for the learning data, the learning data generation apparatus 10 is able to appropriately generate the learning data that is suitable for the object to be classified.

Furthermore, the classification determination unit 38 may change at least one of the first threshold K1 and the second threshold K2 in accordance with the number of images (learned images) that are used for the learned model. More specifically, the classification determination unit 38 may change at least any of the first threshold K1, the second threshold K2, the threshold K2A, and the third threshold K3 in accordance with the number of images (learned images) that are used for the learned model. With this configuration, it is possible to appropriately change the threshold depending on a change in the number of the images, so that it is possible to appropriately generate the learning data that is suitable for the object to be classified.

According to the present application, it is possible to appropriately collect learning data that is suitable for an object to be classified.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A learning data generation apparatus comprising:
an object extraction unit configured to extract an object image from an image;
a classification evaluation unit configured to evaluate the object image based on a learned model and to thereby calculate reliability indicating a degree of possibility that the object image is classified as a candidate label;
a classification determination unit configured to, if the reliability is smaller than a first threshold and equal to or larger than a second threshold which is smaller than the first threshold, associate a temporary label different from the candidate label with the object image; and
a learning data generation unit configured to generate learning data based on the object image that is associated with the temporary label, wherein
the classification determination unit is further configured to associate a first temporary label that is different from the candidate label with the object image if the reliability is equal to or larger than an intermediate threshold which is smaller than the first threshold and larger than the second threshold, and smaller than the first threshold, and associate a second temporary label different from the first temporary label with the object image if the reliability is equal to or larger than the second threshold and smaller than the intermediate threshold.

2. A learning data generation apparatus comprising:
an object extraction unit configured to extract an object image from an image;
a classification evaluation unit configured to evaluate the object image based on a learned model and to thereby calculate reliability indicating a degree of possibility that the object image is classified as a candidate label;
a classification determination unit configured to, if the reliability is smaller than a first threshold and equal to or larger than a second threshold which is smaller than the first threshold, associate a temporary label different from the candidate label with the object image; and
a learning data generation unit configured to generate learning data based on the object image that is associated with the temporary label, wherein the classification determination unit is further configured to associate the object image with the candidate label if the reliability is smaller than a third threshold which is larger than the first threshold, and equal to or larger than the first threshold, and the learning data generation unit is further configured to generate the learning data based on the object image that is associated with the temporary label or the candidate label.

3. A learning data generation apparatus comprising:

an object extraction unit configured to extract an object image from an image;

a classification evaluation unit configured to evaluate the object image based on a learned model and to thereby calculate reliability indicating a degree of possibility that the object image is classified as a candidate label;

a classification determination unit configured to, if the reliability is smaller than a first threshold and equal to or larger than a second threshold which is smaller than the first threshold, associate a temporary label different from the candidate label with the object image; and a learning data generation unit configured to generate learning data based on the object image that is associated with the temporary label, wherein the classification determination unit is further configured to change at least one of the first threshold and the second threshold in accordance with a number of the images that are used for the learned model.

4. A learning model generation system configured to generate a learned model based on the learning data that is generated by the learning data generation apparatus according to claim 1.

5. A learning data generation method comprising:

extracting an object image from an image;

evaluating the object image based on a learned model and calculating reliability indicating a degree of possibility that the object image is classified as a candidate label;

associating a temporary label different from the candidate label with the object image if the reliability is smaller than a first threshold and equal to or larger than a second threshold which is smaller than the first threshold; and generating learning data based on the object image that is associated with the temporary label, wherein the associating further comprises associating a first temporary label that is different from the candidate label with the object image if the reliability is equal to or larger than an intermediate threshold which is smaller than the first threshold and larger than the second threshold, and smaller than the first threshold, and associating a second temporary label different from the first temporary label with the object image if the reliability is equal to or larger than the second threshold and smaller than the intermediate threshold.

6. A learning model generation system configured to generate a learned model based on the learning data that is generated by the learning data generation apparatus according to claim 2.

7. A learning model generation system configured to generate a learned model based on the learning data that is generated by the learning data generation apparatus according to claim 3.

8. A learning data generation method comprising:

extracting an object image from an image;

evaluating the object image based on a learned model and calculating reliability indicating a degree of possibility that the object image is classified as a candidate label;

associating a temporary label different from the candidate label with the object image if the reliability is smaller than a first threshold and equal to or larger than a second threshold which is smaller than the first threshold; and generating learning data based on the object image that is associated with the temporary label, wherein the associating further comprises associating the object image with the candidate label if the reliability is smaller than a third threshold which is larger than the first threshold, and equal to or larger than the first threshold, and the generating further comprises generating the learning data based on the object image that is associated with the temporary label or the candidate label.

* * * * *